United States Patent
Strait et al.

(10) Patent No.: US 6,834,079 B1
(45) Date of Patent: Dec. 21, 2004

(54) EFFICIENT IMPLEMENTATION FOR EQUALIZATION OF MULTICARRIER CHANNELS

(75) Inventors: Jeffrey C. Strait, Reno, NV (US); Eugene T. Sy, Cupertino, CA (US)

(73) Assignee: 3Com Corporation, Santa Clara, CA (US)

( * ) Notice: Subject to any disclaimer, the term of this patent is extended or adjusted under 35 U.S.C. 154(b) by 701 days.

(21) Appl. No.: 09/693,498

(22) Filed: Oct. 20, 2000

(51) Int. Cl.[7] .............................. H03H 7/30; H03H 7/40; H03K 5/159
(52) U.S. Cl. ...................................... 375/232; 375/229
(58) Field of Search ................................. 375/232, 229

(56) References Cited

U.S. PATENT DOCUMENTS

| | | | | |
|---|---|---|---|---|
| 5,903,605 A | * | 5/1999 | Crittenden | 375/226 |
| 6,535,552 B1 | * | 3/2003 | Pessoa | 375/231 |
| 2003/0002574 A1 | * | 1/2003 | Yang et al. | 375/229 |

OTHER PUBLICATIONS

Complex Scaled Tangent Rotations(CSTAR) for Fast Space–time Adaptive Equalization for Wireless TDMA. Massi-miliano Martone; IEEE Transactions on Communications, vol. 46, No. 12, Dec. 1998, pp. 1587–1590.*

Laakso, et al, "Splitting the Unit Delay", IEEE Signal Processing Magazine, pp 30–60, Jan. 1996.

R.K. Bock, "Givens Rotation," website printout (2pages), Sep. 15, 2000.

R.K. Bock, "QR Decomposition," website printout (1 page), Sep. 15, 2000.

R.K. Bock, "Normal Equations," website printout (1 page), Sep. 15, 2000.

* cited by examiner

*Primary Examiner*—Stephen Chin
*Assistant Examiner*—Harry Vartanian
(74) *Attorney, Agent, or Firm*—McDonnell Boehnen Hulbert & Berghoff LLP (57) ABSTRACT

A system and method for minimizing the effective channel impulse response in multitone communication systems, is provided. A time domain equalizer is utilized to shorten the channel impulse response to a length equal to or less than the time duration of the cyclic prefix. The time domain equalizer includes an adaptable filter with updateable coefficients. The updateable coefficients are calculated in a storage efficient manner to effectively estimate a desirable channel response. Processing of the time domain equalizer signal improves the symbol boundary estimate and effectively reduces the effect of noise of the updateable coefficient solution.

24 Claims, 4 Drawing Sheets

EFFICIENT IMPLEMENTATION FOR EQUALIZATION OF MULTICARRIER CHANNELS

FIELD OF THE INVENTION

This present invention relates to equalization of telecommunication devices. More specifically, it relates to a system and method for providing channel equalization between communicating modems.

BACKGROUND OF THE INVENTION

Today, modern communication systems can provide higher speed data communications over the same copper wires that traditionally only carried plain old telephone service ("POTS"). Many of these high-speed communication systems utilize a modulation technique known as discrete multitone ("DMT") modulation. A popular communication system that uses DMT is known as Digital Subscriber Line ("DSL"). DSL communication systems can provide homes and small businesses high-speed communication access to the Internet and other networks using ordinary copper telephone lines. A central office ("CO") is typically equipped with a CO DSL modem that provides broadband DSL services such as high-speed Internet access, audio, and video services to a subscriber. To receive DSL services from the CO, the customer premises typically includes a DSL modem or more generally a remote transceiver ("RT") to terminate a communication link with a CO DSL modem providing high-speed communication services.

The DSL modem pair (i.e., the RT and CO DSL modems) transfers data to and from the CO preferably using communication standards set out by the American National Standards Institute ("ANSI") such as Standard T1.413, the contents of which are incorporated by reference. ANSI T1.413 specifies a standard for ADSL that is widely followed in the telecommunications industry. The RT DSL modem in connection with a DSL modem at the CO may receive data at rates up to 6.144 Mbps for asymmetric DSL ("ADSL") and even higher data rates for other DSL variants to provide continuous transmission of high bandwidth video and audio data. Because of a DSL communication system's high data rate capability and its ability to operate over ordinary copper telephone lines, DSL installations are expected to greatly increase in homes and small businesses.

A drawback of DSL, however, is that the ordinary copper telephone line or the communication channel exhibits an undesirable characteristic known as frequency dependent propagation. Frequency dependent propagation leads to a dispersive behavior of the channel, resulting in a wider received pulse at the remote transceiver and causing a time sample to spread into the neighboring time slots. Thus, a time sample may not contain only the contribution of the corresponding sent sample, but also portions of neighboring samples, referred to as intersymbol interference ("ISI").

To reduce the effects of ISI, an equalizer is often utilized at the receiver. However, an equalizer typically estimates the channel response in order to reduce the channel response effects on the sent signal. To estimate the channel response, the equalizer performs many calculations, sometimes in the millions of calculations, and can often become memory storage intensive, which can prohibit their use in embedded systems. Furthermore, noise or interference that may distort the signals passing through the communication channel can have undesirable effects on the estimation of the channel response.

The embodiments described herein provide for a more time and storage efficient equalization of the communication channel.

SUMMARY OF THE INVENTION

The system and method for channel equalization in discrete multitone communication systems is provided. The exemplary embodiments disclose a system and method capable of reducing the memory storage needed for channel equalizer training. Additionally, the equalization signal is processed to reduce the effect of noise on the equalization training and to accommodate over-sampled receivers.

In accordance with one aspect of the present embodiments, at least one set of equalizer filter coefficients are determined by forming a matrix of data from received and transmitted signals. The matrix is formed into an upper triangular system by performing orthogonal transformations on the matrix. The coefficients are then determined by performing a back-substitution on the upper triangular system.

In accordance with another aspect of the present embodiments, the equalizer training signal is processed to further reduce the effect of noise on the calculation of the filter coefficients. Additionally, the signal can be processed to accommodate over-sampled receivers to improve sub-sample symbol boundary estimation.

The present embodiments provide for an efficient and effective time domain equalization system using the least squares method for discrete multitone communication systems. The embodiments include processing the received signal and the reference signal in order to improve the symbol boundary estimate and reduce the effects of noise on the filters coefficient solution. Furthermore, the embodiments provide a method of reducing the condition of the deterministic correlation matrix used in the least squares method. Included in the embodiments, is a method for realizing a storage-efficient solution of the least squares calculation. The present embodiments can be applied to an over-sampled DMT receiver.

The foregoing and other objects, features and advantages of the system and method for will be apparent from the following more particular description of preferred embodiments of the system and the method as illustrated in the accompanying drawings.

BRIEF DESCRIPTION OF THE DRAWINGS

Preferred embodiments of the present inventions are described with reference to the following drawings, wherein.

DETAILED DESCRIPTION OF PREFERRED EMBODIMENTS

Figure 1:
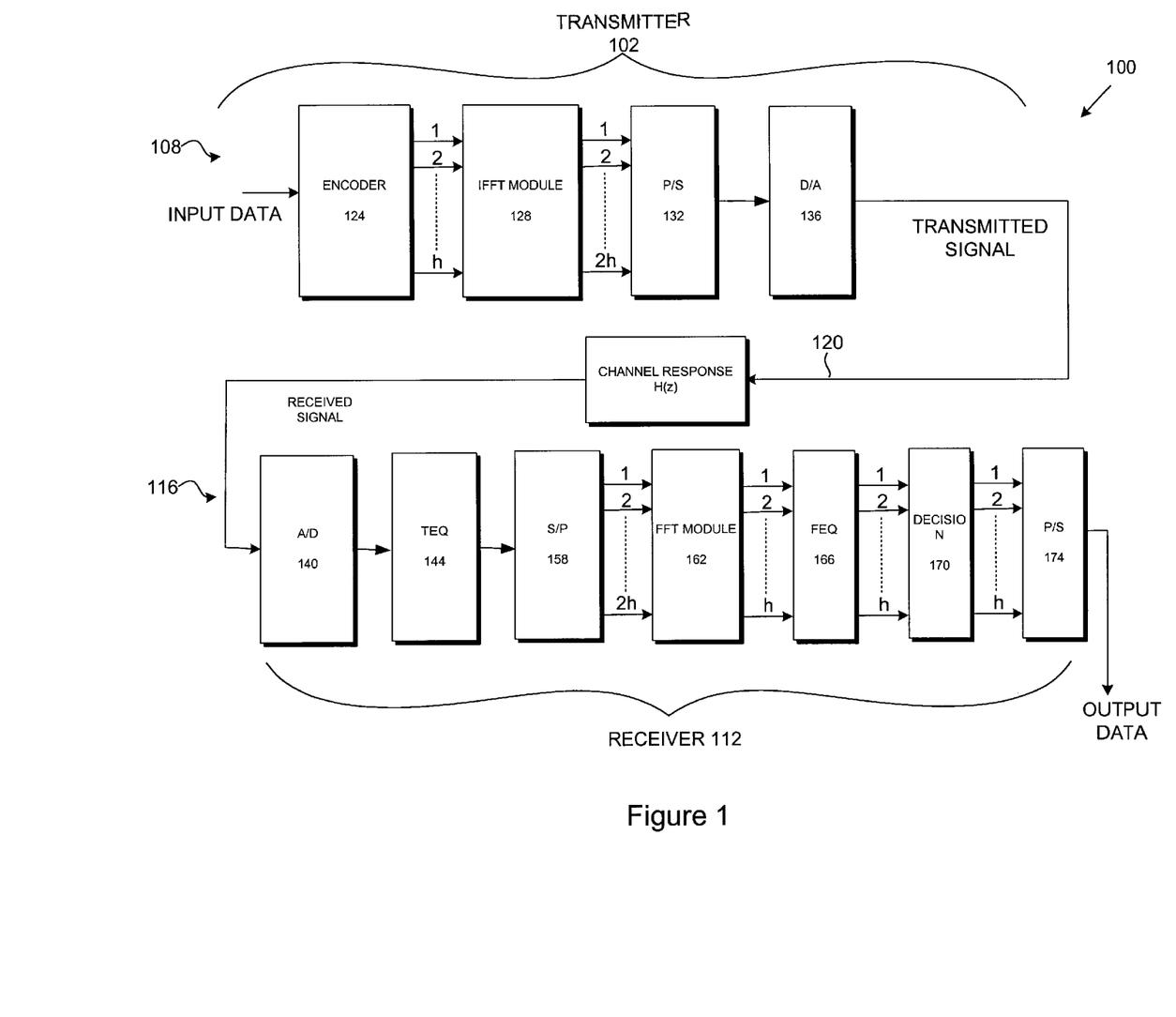
FIG. 1 is a diagram illustrating an exemplary system with an equalizer that utilizes the present embodiments.

FIG. 1 shows a high level system diagram illustrating an exemplary process of a system utilizing the efficient and effective equalization system of the present embodiments.

Additional elements such as trellis codes or echo cancellation have been omitted for clarity and ease of illustration. It should also be understood that the described system and processes can be applied to a number of different applications for system equalization. However, the system and method of the present embodiments have been implemented in a communication system compatible with asymmetric digital signal line ("ADSL") transmission protocols, as set forth in the American National Standards Institute ("ANSI") specification T1.413. The embodiments are also well suited for other multicarrier, discrete multi-tone ("DMT"), or orthogonal frequency division modulation ("OFDM") systems.

In the exemplary embodiment, the discrete multitone ("DMT") communication system 100 operates generally as shown in FIG. 1. The DMT communication system 100 is generally made up of two or more DMT transceivers. Typically, each DMT transceiver includes a receiver and a transmitter for both receiving and transmitting data to other communicating transceivers. The DMT communication system 100 in FIG. 1, however, shows a transmitter 102 from a first DMT transceiver 108 communicating with a receiver 112 from a second DMT 116 transceiver, where the first DMT transceiver 108 is different than the second DMT transceiver 116. The receiver from the first DMT transceiver 108 and the transmitter from the second DMT transceiver 116 are omitted from FIG. 1 for purposes of clarity and ease of illustration. It should be understood, however, that the first and second DMT transceiver 108, 116 preferably each has a receiver and a transmitter.

Preferably, the first and second DMT transceivers 108, 116 are connected to a transmission medium 120 such as a standard twisted pair cable or a wireless network. In this embodiment, the first DMT transceiver 108 is located at a central office or service provider and the second DMT transceiver 116 is located at a remote location such as in a home or business. The second DMT transceiver 116 may be connected to computers, computer peripherals such as printers and modems, copiers, fax machines and personal digital assistants. Also suitable for connection are TVs, audio-visual equipment, security systems, as well as less intelligent devices such as appliances, thermostats, and lighting fixtures. Less intelligent devices may have a simplified transceiver than that shown in FIG. 1.

Referring to the first DMT transceiver 108, data in the form of an incoming serial bit-stream at the data rate R bits/second ("bps") is encoded into blocks of b=RT bits at the encoder 124, where T is the symbol period and 1/T is the symbol rate. In this embodiment, the transmitted signal over the symbol period T is called the symbol. Of the b bits, $b_i (i=1, \ldots h)$ are intended for use in the $i_{th}$ sub-channel for a total of h sub-channels. According to the American National Standards Institute ("ANSI") Standard T1.413, ADSL may utilize up to 256 sub-channels, where each sub-channel utilizes a carrier with approximately 4.3125 kHz bandwidth. According to ANSI T1.413, each carrier can be independently modulated from zero to a maximum of 15 bits/sec/Hz.

The process of modulating bits onto a sub-channel is referred to as bit loading. Bit loading includes the assigning of a number of bits and the amount of power to each available sub-channel. Typically, a bit loading table is generated during initialization between the first and second DMT transceiver 108, 116 to determine the available sub-channels that can then be used for communication between the two transceivers 108, 116. The actual number of sub-channels used in communication between the first and second DMT transceiver 108, 116 often depends on factors such as noise and interference detected on the transmission medium 120 during initialization. Depending on design constraints such as transmission medium 120 length and material characteristics, bit loading can be tailored towards different parameters such as the bit error rate ("BER"), transmit power, or total bit rate. It would be appreciated by those skilled in the art that a number of different bit loading and encoding schemes may be utilized with the present embodiments.

The loaded sub-channels (i.e., up to h sub-channels) are input into the Inverse Fast Fourier Transform ("IFFT") module 128. The input into the IFFT module 128 is a vector of constellation points defining the amplitude and phase of each carrier. Output of the IFFT module 128 can consist of up to 2h time domain samples that are sent to a parallel to serial converter 132 to be transformed into a serial time domain signal.

Thus, the parallel output of the IFFT 128 is converted into a serial bit-stream and preferably, a cyclic prefix is added. The cyclic prefix often results by copying samples taken from the end of each transmitted symbol and attaching them to the beginning of the transmitted symbol. The addition of the cyclic prefix creates a guard space between neighboring transmit symbols in the time domain signal to reduce intersymbol interference ("ISI"). Preferably, the pulse dispersion introduced by the transmission medium 120 impulse response H(z) is less than the length of the added cyclic prefix. In this embodiment, time domain equalizing is utilized in order to restrict the length of the equalized impulse response to a length less than or equal to that of the cyclic prefix, as described more below.

The serial time domain signal is then sent to a digital to analog converter ("D/A") 136 to convert the serial time domain signal into an analog signal and consequently broadcast the analog signal onto the transmission medium 120. Preferably, a filter may be placed after the D/A 136 such as to attenuate the high frequency copies of the transmit signal that are created due to the zero-order hold characteristic of the D/A converter 136.

The analog signal is broadcast over the transmission medium 120, whereupon the second DMT transceiver 116 receives the transmitted signal. The receiver 112 at the second DMT transceiver 116 converts the received analog signal into a digital time domain signal by the analog to digital converter ("A/D") 140.

The digital serial signal is then sent to the time domain equalizer ("TEQ") 144. The TEQ 144 attempts to shorten the impulse response of the channel 120 to a length, shorter than or equal to the cyclic prefix. The channel 120 has a channel response, H(z), that can cause a variation in the signal's propagation effectiveness, which is often a function of frequency and can lead to channel dispersion. Channel dispersion can cause interference between consecutive time domain symbols. To reduce the channel effect on the received signal, the TEQ 144 attempts to equalize the channel response.

Figure 2:
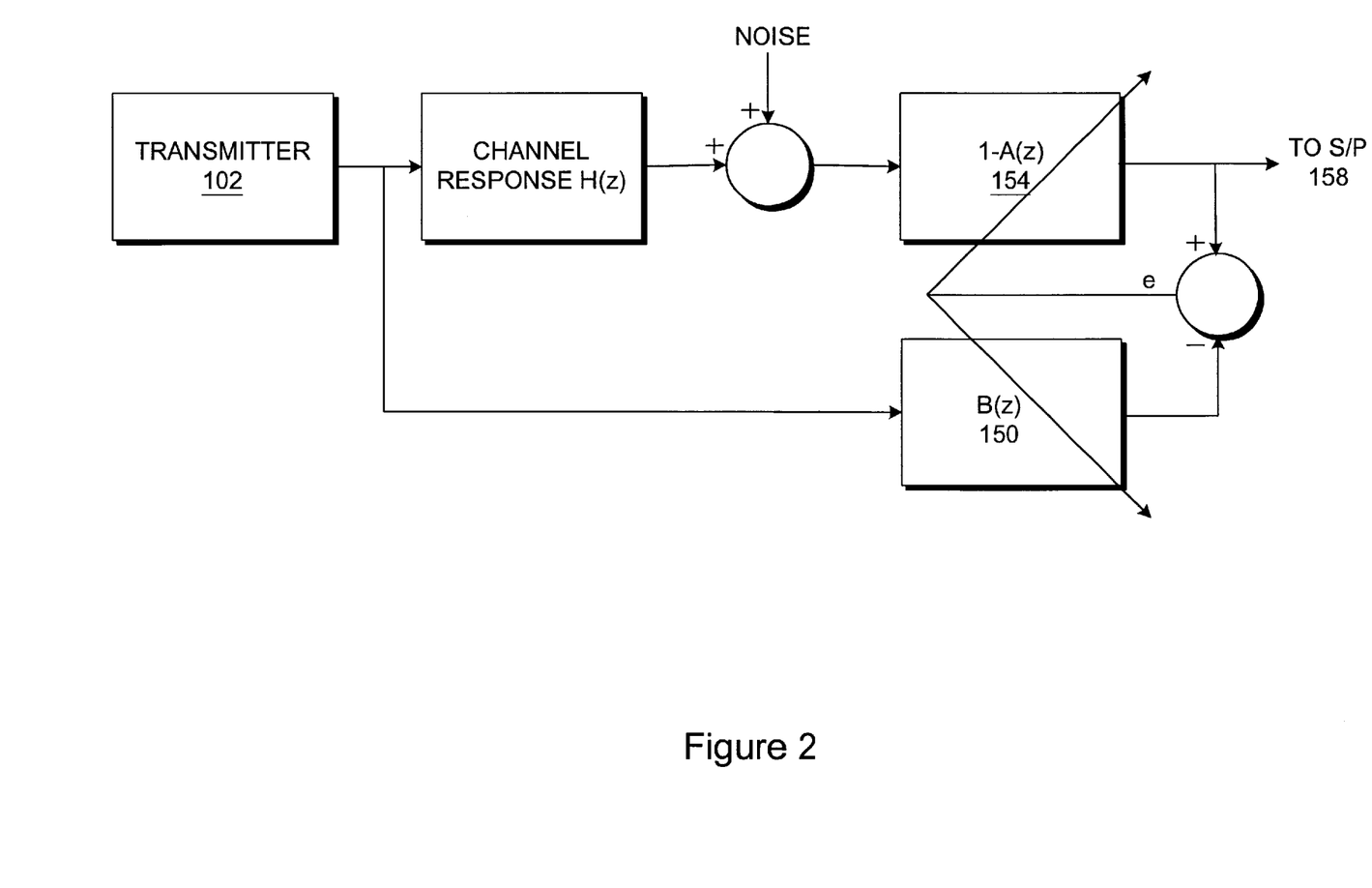
FIG. 2 is a diagram illustrating an exemplary model of the equalization process used in the equalizer of FIG. 1.

FIG. 2 shows a block diagram of the TEQ 144 utilized in these exemplary embodiments. In this embodiment, the TEQ 144 attempts to estimate the channel 120 with a pole-zero model. The filter B(z) 150, which has J+1 taps, and the filter 1-A(z) 154, which has K taps, are estimated during equalization training. B(z) is referred to as the target impulse response ("TIR") that has a length constrained to the desired transmission medium 120 impulse response length. Preferably, the length of the filter B(z) 150 is selected to match the length of the cyclic prefix defined in the ANSI Standard T1.413. The filter 1-A(z) 154 is an adaptable TEQ filter that shortens the transmission medium response length to the response length of B(z) 150. Training the TEQ 144 involves calculating the taps for filter B(z) 150 and filter 1-A(z) 154 in order to minimize the appropriate error criterion, more of which is described later. Preferably, after initialization such as during the SHOWTIME state according to ANSI T1.413, the target impulse response filter B(z) 150 is no longer necessary and therefore can be discarded after the TEQ 144 training.

Preferably, the calculation of the taps is accomplished during the training sequence between the first and second DMT transceiver 108, 116. Thus, according to ANSI standard T1.413 the determination of the taps are performed in the REVERB training sequence such as REVERB1 or REVERB2 or REVERB3 or in all three. It should be understood however, that the present embodiments can be utilized to calculate the filter taps at any time other than the training sequence as long as the communicating transceivers are configured to do so.

Referring back to FIG. 1, after equalization and removal of the cyclic prefix, the incoming serial stream of samples is converted into blocks of parallel data with an integral multiple of 2h parallel values at the serial to parallel converter 158. These parallel values are fed into a Fast Fourier Transform ("FFT") 162, thus transforming the time domain signal into the frequency domain. The transform into the frequency domain also provides the separation of the integral multiple of h parallel independent sub-channels whose contents can now be further processed on a per subchannel base by a frequency domain equalizer ("FEQ") 166. It should be understood that the integral multiple of 2h parallel values allow for the use of oversampled FFT demodulators 162. For example, if the integral multiple is 2 then there are 2*2h parallel values, hence the FFT 162 is a twice oversampled FFT 162. By oversampling at the FFT 162, aliasing can be reduced.

In this embodiment, the FEQ 166 is a set of complex one-tap per subchannel equalizers that adaptively scales each sub-channel by the inverse of the transmission media 120 gain and phase delay, including transmitter and receiver filters, so that a common decision boundary can be used in decoding the constellations. The initial tap-values for the FEQ 166 are learned during the start-up procedure. First, the effective channel frequency transfer function of the equalized channel is estimated and then it is inverted in order to receive the tap values for the FEQ 166. During the data mode the equalizer taps are continuously updated in a decision directed manner. Therefore, even in case of the use of a Viterbi receiver to decode trellis coded modulation, a decision element is included to make decisions at the output of the FEQ 166. The output of this decision device 170 is then compared with its input for each subchannel and the FEQ-taps are then adjusted accordingly. Typically, the step size for the tap-adaptation is selectively small in order to avoid problems due to error propagation, leading to adjustments into the wrong direction due to wrong decisions.

Preferably, in the decision device 170 the symbols of the sub-channels are detected, using the knowledge about the bit power allocation, and therefore the sub-blocks of bits that have been assigned to the sub-channels are recovered. Once the sub-blocks are detected, the data is re-converted into a serial bit stream in a block by block fashion, as performed by a parallel to serial converter 174. If trellis coded modulation is used, the decision device in the main data-stream can be replaced by a Viterbi receiver to make maximum likelihood decisions on the transmitted sequences.

It should be understood that the system shown in FIGS. 1 and 2 is exemplary for purposes of illustration only and that the present embodiments can be applied to other systems in need of channel equalization, such as in orthogonal frequency division multiplexing ("OFDM") systems. In addition, the present embodiments may be utilized in other variations of the system shown in FIGS. 1 and 2. Elements in the FIGS. 1 and 2 have been left out such as trellis coding and echo cancellation for purposes of clarity and illustration, and are not necessary to understand the present embodiments. Furthermore, a number of different variations of the FEQ and the decision device may be utilized with the present embodiments.

Figure 3:
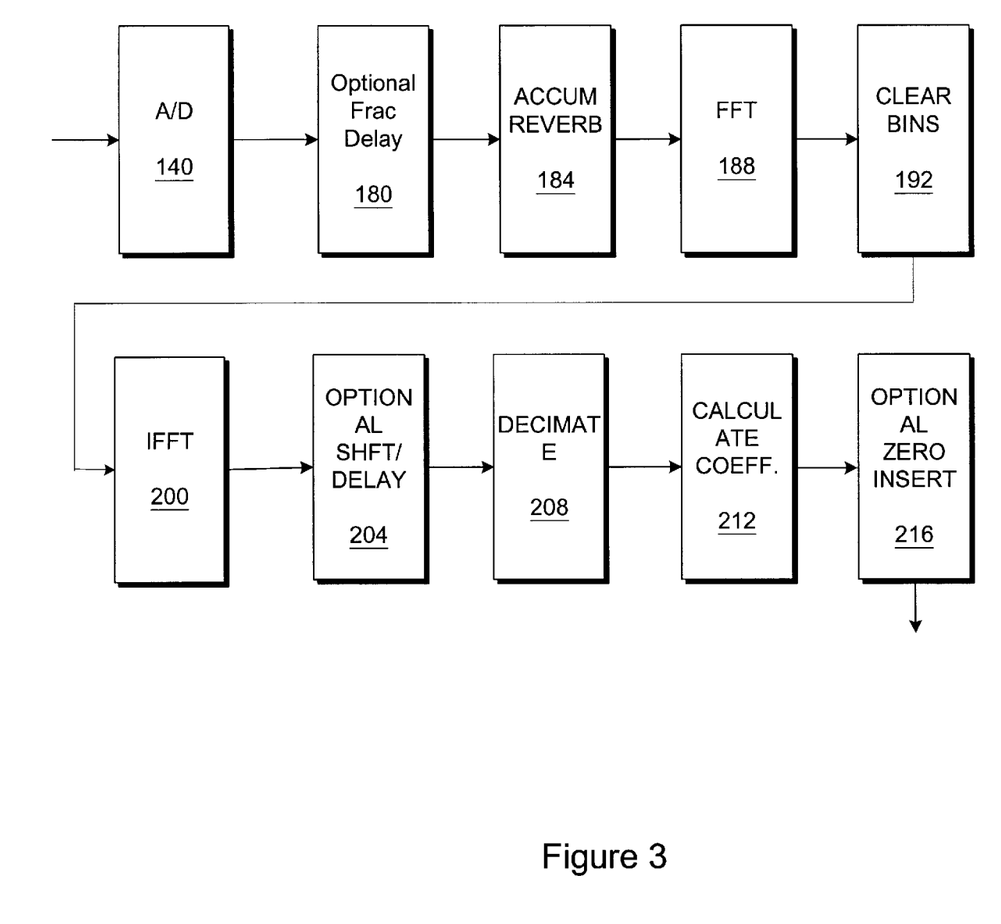
FIG. 3 is a diagram illustrating the equalizer signal conditioning process in accordance with the present embodiments.

FIG. 3 shows in more detail the TEQ signal conditioning. In this embodiment, the DMT receiver operates with a two times over-sampled A/D 140, or equivalently the signal is sampled two times the Nyquist sampling rate. The signal presented to the receiver is then devoid of transmitted information in the upper half band and processed to reduce the noise in those bins above the Nyquist frequency and in any unloaded bins. The TEQ signal conditioning typically occurs during initialization, or according to ANSI standard T1.413, during one of the REVERB states. Thus, according to ANSI T1.413 a REVERB symbol is periodically broadcast over the transmission medium to a receiving transceiver during one of the REVERB states. Preferably, the receiving transceiver is pre- configured with the REVERB symbol.

After the REVERB symbol is received by the A/D 140 at the receiver 116, an optional fractional delay filter 180 can be utilized to more precisely align the receiver 116 with the received signal's symbol boundary. Furthermore, the fractional delay filter 180 can provide improved sub-sample symbol boundary estimate precision. The fractional delay filter 180 is optional and is typically not required when the shift/delay 204 is used, as described more below.

From the fractional delay filter 180, the symbol accumulator 184 can average the REVERB symbol over a block of symbols. By averaging the REVERB symbol over a block of symbols, random noise and its effects on the TEQ training can be reduced.

From the symbol accumulator 184, the signal is further processed by a FFT 188 to convert the signal from the time domain to the frequency domain. Optionally, a high density transform is utilized to enable sub-sample symbol boundary resolution as part of the symbol boundary estimation, which can further assist the calculation of the TEQ coefficients. In this exemplary embodiment, a 512 point FFT 188 is utilized giving a symbol size of 128 samples. It should be understood, however, that a variety of different sized FFTs can be utilized in the present embodiments and are typically dependent on the desirable symbol alignment. For example, a 128 point FFT can give a symbol size of 64 samples, whereas a 1024 FFT can give a symbol size of 512 samples. The additional density of the 1024 or 512 point FFT can allow for a more precise symbol alignment, but is not necessary according to the present embodiments.

From the FFT 188, the unused sub-channels or bins are cleared 192, preferably to zero. This can reduce out-of-band noise from the accumulated REVERB symbol, because the signals in unpopulated or out of band bins are often noise. By setting those bins to zero, noise is then reduced. Additionally, the bins above the Nyquist frequency or equivalent those bins that utilize frequencies above the upper passband edge might contain noise, thus those bins may also be cleared to zero to reduce any noise.

Other bins such as the stop-band, upstream bins (e.g., bins used to send data to the central office), and bins near plain old telephone service ("POTS") utilized frequencies may be cleared to zero. For example, according to ANSI T1.413 the upstream spectrum can utilize bins 1 through 32 while the down stream spectrum, typically used in remote transceiver equalizer training, can utilize bins 33 through 255. Therefore, bins 1–32 are typically not used in the down stream direction and may be cleared to zero. Bins in locality to POTS (POTS can utilize frequencies from DC to 4 kHz) such as bins 1–6 (bin 1 is typically at 4.3125 kHz) are typically not used by training signals, so bins 1–6 may also be cleared to zero. By clearing all of the known non-active bins, the effect of noise on the calculation of TEQ coefficients is preferably minimized. It should be understood that a different set of bins other than bins 33–255 might be used in training the TEQ and can depend on the set of bins that are used in communication between a set of communicating devices. For example, if the transceiver at a central office is undergoing the equalizer training, a different set of bins such as bins 33 through 255 may be cleared to zero, whereas bins 1–32 could be used for training. Nevertheless, after the unused bins are cleared 192, an IFFT 200 is performed on the used bins to convert the signal from the frequency domain back into the time domain.

From the IFFT 200, the signals may be passed through an optional shift or delay 204. The shift or delay 204, similarly to the optional fractional delay 180, can provide improved sub-sample symbol boundary estimate precision. It is not necessary, however, to have both the optional shift/delay 204 and the fractional delay filter 180 in the system to operate concurrently. The shift/delay 204 and the delay filter 180 perform a similar function, but the fractional delay filter 180 can also provide alignment during the SHOWTIME state in addition to the TEQ training. The SHOWTIME state, according the ANSI standard T1.413, is the steady state at which initialization between the communicating transceivers has already been performed.

The signal is then decimated 208 by discarding samples to generate a Nyquist sampled signal, assuming the signal was two times over sampled at the A/D 140. Aliasing is reduced if not eliminated because the stop-band bins were preferably cleared to zero. The Nyquist sampled received signal and the one times sampled reference signal are then used to generate a TEQ solution designed to operate at the one times sampled rate. The reference signal is the signal before it was transmitted, such as the signal for a given symbol period defined in the ANSI standard to be the REVERB symbol. Thus, the reference signal preferably contains data that has not been affected by the channel effects. Unlike the reference signal, the received signal might have been affected by the channel effects, because it was broadcast over the transmission medium 120.

Upon receipt of the decimated signal, the filter coefficients or taps of the TEQ are determined 212 by forming a matrix of data from the received signal and the reference signal. By forming the matrix of data into an upper triangular system, the filter coefficients that correspond to filter A(z) 154 and filter B(z) 150 can be determined.

The stop-band can possess severe channel attenuation. Furthermore, the transmitted signal can contain very little energy outside the pass-band such as side lobes. Thus in this embodiment, the TEQ filter 1-A(z) 154 and TIR filter B(z) 150 are up sampled to the two times over-sampled rate by inserting zeros between all the coefficients produced from above. For example, if the coefficients are calculated at the one times Nyquist rate as [h(0),h(1),h(2), . . . ,h(1)], then the filters used at the two times Nyquist rate would be [h(0),0, h(1),0,h(2), . . . ,0,h(1)]. Preferably, zero-valued coefficients do not require any computational operations, so the complexity of the two times over sampled TEQ is the same as the one times sampled TEQ.

In an alternate embodiment, the A/D 140 does not have to over-sample the received signal. For example, if the A/D 140 samples the signal above the Nyquist rate, but the FFT demodulator 188 runs at the Nyquist rate, the methods above may still be used, except that the coefficients determined at the one times rate do not have to be up sampled. Also, if the A/D 140 samples the signal at the Nyquist rate, the above method may still be used to reduce the effects of noise in deactivated bins.

Training the TEQ involves calculating coefficients 212 in order to minimize an error criterion such as the mean squared error or sum of squared errors. In this embodiment, the least squares method is utilized for finding the TEQ 144 coefficients 212. The sum of squared errors is given by the following relationship:

$$\xi = \sum_{n=0}^{M} e^2(n) = \sum_{n=0}^{M} [y(n) - w^T u(n)]^2$$

where e is the error or difference between output of the 1-A(z) filter 154 and the output of the B(z) filter 150 (shown in FIG. 2) and M is the number of samples and is empirically determined, such as the length of one REVERB symbol and also greater than the length of the vectors w and u, and where:

$$u(n) = \begin{bmatrix} y_{n-1} \\ \vdots \\ y_{n-k} \\ x_n \\ \vdots \\ x_{n-J} \end{bmatrix} \quad w = \begin{bmatrix} a_1 \\ \vdots \\ a_K \\ b_0 \\ \vdots \\ b_J \end{bmatrix}$$

Here, u(n) is a vector of y and x that corresponds to the received and transmitted data, respectively. Preferably, the transmitted data x is known to the receiver and is defined in the ADSL standard T1.413 to be REVERB. There are K samples of y and J+1 samples of x, where N=K+J+1. The vector w is a vector made up of the filter coefficients, where a and b correspond to the coefficient of filters A(z) and B(z), respectively. The solution vector w that minimizes the sum of squared errors is given by the relationship:

$$w_{opt} = R_{uu}^{-1} p_{yu}$$

where:

$$R_{uu} = \sum_{n=0}^{M} [u(n)u^T(n)] = [u(0) \ldots u(M)] \begin{bmatrix} u^T(0) \\ \vdots \\ u^T(M) \end{bmatrix} = A^T A \text{ and}$$

$$p_{yu} = \sum_{n=0}^{M} [y(n)u(n)] = [u(0) \ldots u(M)] \begin{bmatrix} y(0) \\ \vdots \\ y(M) \end{bmatrix} = A^T y$$

Where the (M+1,N) matrix A and vector y are defined as the following:

$$A = \begin{bmatrix} y_{-1} & y_{-2} & \cdots & y_{-K} & x_0 & x_{-1} & \cdots & x_{-J} \\ y_0 & y_{-1} & \cdots & y_{K+1} & x_1 & x_0 & \cdots & x_{J+1} \\ \vdots & \vdots & & \vdots & \vdots & \vdots & & \vdots \\ y_{M-1} & y_{M-2} & \cdots & y_{M-K} & x_M & x_{M-1} & \cdots & x_{M-J} \end{bmatrix} \text{ and}$$

$$y = \begin{bmatrix} y_0 \\ y_1 \\ \vdots \\ y_M \end{bmatrix}$$

Recognizing the linear equations shown above as the normal equations, it follows that the solution w is the vector that minimizes J:

$$J = \|Aw - y\|_2$$

In the present embodiments, a storage efficient way of minimizing J involves the use of a matrix transformation known as Givens rotations to apply a QR factorization to matrix A. Thus, a series of orthogonal rotations are applied to the matrix A and y to create the upper triangular system given by the relationship:

$$Rw = Q^T y$$

where the relationship of the matrix $A_u$ (where $A_u$ consists of at least the top N+1 rows of A) to matrix R and matrix Q is given by: (the equation below is changed)

$$Q^T A_u = \begin{bmatrix} R \\ 0 \end{bmatrix}$$

where matrix R is an upper triangular matrix and matrix Q is preferably an (N+1,N+1) matrix. Once matrix $A_u$ is in triangular form, designated by matrix R, a fast back-substitution routine can be used to determine the solution vector w. A back substitution routine may take up to $(K+J+1)^2/2$ operations to determine the solution to w and consequently to determine the filter coefficients of 1-A(z) 154 and B(z) 150. Many well-known back-substitution routines requiring more or less operations can be utilized to determine the vector solution w in accordance with the preferred embodiments.

Figure 4:
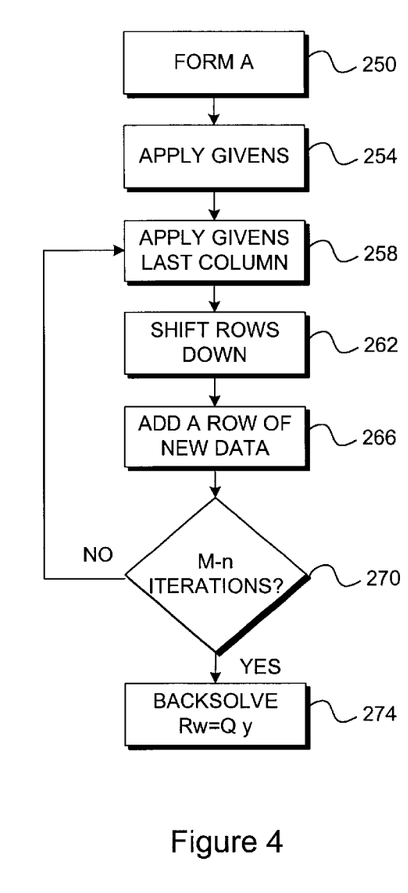
FIG. 4 is a flow diagram illustrating an exemplary method of calculating filter taps of the process in FIG. 3.

Givens rotations are orthogonal transformations applied to the columns of matrix $A_u$. A single rotation introduces a zero in a desired position in a vector, and involves only two elements of that vector. FIG. 4 shows the process of calculating the filter coefficients for filter 1-A(z) 154 and filter B(z) 150 using Givens rotations. In step 250, the matrix A is formed. Matrix A, as defined above, contains K samples of the received signal y and J+1 samples of the transmitted signal x. Preferably the matrix $A_u$ has N+1 rows and N columns, where N=k+J+1.

In step 254, Givens Rotations is applied such that the matrix is near upper triangular. For example, zeros can be introduced in the lower left corner of the matrix $A_u$ in a systematic fashion.

$$Q_0 \begin{bmatrix} x & x & x & \cdots & x \\ x & x & x & \cdots & x \\ x & x & x & \cdots & x \\ & & \vdots & & \\ x & x & x & \cdots & x \\ x & x & x & \cdots & x \end{bmatrix} = \begin{bmatrix} x & x & x & \cdots & x \\ x & x & x & \cdots & x \\ x & x & x & \cdots & x \\ & & & \cdots & x \\ c & c & c & \cdots & c \\ 0 & c & c & \cdots & c \end{bmatrix}$$

Assuming $A_u$ has N columns, all the rows up to the $N^{th}$ row from the bottom can be eliminated. This can give:

$$Q_{n-1} \cdots Q_1 Q_0 \begin{bmatrix} x & x & x & \cdots & x \\ & & \vdots & & \\ x & x & x & \cdots & x \\ x & x & x & \cdots & x \\ & & \vdots & & \\ x & x & x & \cdots & x \\ x & x & x & \cdots & x \end{bmatrix} = \begin{bmatrix} x & x & x & \cdots & x \\ & & \vdots & & \\ 0 & c & c & \cdots & c \\ 0 & c & c & \cdots & c \\ & & \vdots & & \\ 0 & c & c & \cdots & c \\ 0 & c & c & \cdots & c \end{bmatrix}$$

Then, the same procedure can be applied with the second column. This time, only N-1 rotations are needed.

$$Q_{2n-2} \cdots Q_1 Q_0 \begin{bmatrix} x & x & x & \cdots & x \\ & & \vdots & & \\ x & x & x & \cdots & x \\ x & x & x & \cdots & x \\ & & \vdots & & \\ x & x & x & \cdots & x \\ x & x & x & \cdots & x \end{bmatrix} = \begin{bmatrix} x & x & x & \cdots & x \\ & & \vdots & & \\ 0 & c & c & \cdots & c \\ 0 & c & c & \cdots & c \\ & & \vdots & & \\ 0 & 0 & c & \cdots & c \\ 0 & 0 & c & \cdots & c \end{bmatrix}$$

Continuing in this fashion, the entire lower N+1 rows can be made upper triangular, per step 258. Step 258 applies Givens rotations to zero out the element of the last row such that the matrix is an upper triangular matrix. Thus, the N+1 row or equivalently the bottom row is zeroed out. Note that there has been no need to store any more than N(N+1) intermediates (i.e. the top of the matrix, however large, need not be stored at this time). At this point, note further that the bottom row is all zero.

At step 262, the rows are effectively shifted down, leaving the following structure in storage, by moving pointers judiciously. Another row of data per step 266 can be inserted at the top of the matrix. The matrix might then look like the following:

$$\begin{bmatrix} x & x & x & \cdots & x & x \\ x & x & x & \cdots & x & x \\ 0 & x & x & \cdots & x & x \\ 0 & 0 & x & \cdots & x & x \\ & & & \vdots & \ddots & \\ 0 & 0 & 0 & \cdots & x & x \\ 0 & 0 & 0 & \cdots & 0 & x \end{bmatrix}$$

In step 270, if M-N iterations has taken place, then all of the samples in the M block are in the upper triangular matrix form. If M-N iterations have not taken place, the process can be repeated beginning at step 258 until the top of the matrix is reached, and an upper triangular system is left behind. This is then solved by back-substitution to yield the solution vector w per step 274.

The solution vector w may then be solved to provide the coefficients for the filter A(z) and B(z). The filters, as shown in FIG. 2, may then equalize the channel response H(z) to reduce the effects of channel dispersion. The equalized channel then has a sufficiently short channel impulse response that is preferably contained within the time duration of the cyclic prefix. Thus, by shortening the impulse response, ISI is minimized.

The present embodiments provide for an efficient and effective time domain equalization system using the least squares method for discrete multitone communication systems. The embodiments include processing the received signal and the reference signal in order to improve the symbol boundary estimate and reduce the effects of noise on the coefficient solution. Furthermore, the embodiments provide a method of reducing the condition of deterministic correlation matrix used in the least squares method. Included in the embodiments, is a method for realizing storage-efficient solution of the least squares calculation. In addition, the embodiments may be applied to an over-sampled DMT receiver.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system and method for equalizing the transmission medium may be embodied in a computer program product that includes a computer usable medium. For example, such as, a computer usable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method of channel equalization in a DMT communication system, comprising the steps of:

transmitting a time domain signal over a communication channel;

receiving the time domain signal from the communication channel;

determining a matrix of data from the received signal and the transmitted time domain signal;

determining an upper triangular system, wherein the upper triangular system is determined by performing orthogonal transformations to the matrix of data;

determining a plurality of time domain equalizer coefficients and a plurality of target impulse response coefficients in accordance with the upper triangular system, wherein the plurality of time domain equalizer coefficients in accordance with the upper triangular, wherein the plurality of time domain equalizer coefficients equalize the communication channel.

2. The method of claim 1, wherein the upper triangular system is determined by performing orthogonal transformations using Givens Rotations.

3. The method of claim 1, wherein the step of determining a plurality of time domain equalizer coefficients and a plurality of target impulse response coefficients in accordance with the upper triangular system is performed using back-substitution.

4. The method of claim 1, wherein the method of channel equalization is performed during the training of a time domain equalizer.

5. The method of claim 1, wherein the step of receiving the time domain signal comprises receiving the signal at an over-sampled rate.

6. The method of claim 1, wherein the step of receiving the time domain signal comprises receiving the signal at a Nyquist sampled rate.

7. The method of claim 1, wherein the step of determining a matrix of data from the received signal and the transmitted signal is performed using channel effected data from the received signal and channel non-effected data from the transmitted signal.

8. The method of claim 7, wherein the channel non-effected data is received at a DMT transceiver, and wherein the DMT transceiver was pre-configured with the channel non-effected data from the transmitted signal.

9. A method of processing an equalization training signal, comprising the steps of:

receiving a plurality of symbols;

determining an average of the plurality symbols into frequency domain symbols;

transforming the average of the plurality symbols into frequency domain symbols;

clearing unused bins in the frequency domain; and transforming the frequency domain symbols into time domain symbols, wherein clearing unused bins in the frequency domain reduces the effect of noise on performing channel equalization on the time domain symbol.

10. The method of claim 9, wherein the method further comprises the step of filtering the received plurality of symbols via a fractional delay filter.

11. The method of claim 9, wherein the method further comprises the step of delaying the time domain symbols.

12. The method of claim 9, wherein the step of receiving a plurality of symbols comprises receiving a plurality of REVERB symbols.

13. The method of claim 9, wherein the step of transforming the average of the plurality symbols into frequency domain symbols is performed by a Fast Fourier Transform.

14. The method of claim 9, wherein the step of transforming the frequency domain symbols into time domain symbols is performed by an Inverse Fast Fourier Transform.

15. The method of claim 9, wherein the method further comprises the steps of:

decimating the time domain symbols to a desired sampling rate; and determining the time domain symbols to a desired sampling rate; and determining the time domain equalizer coefficients may be utilized at the desired sampling rate.

16. The method of claim 15, wherein the desired sampling rate is at a Nyquist sampling rate.

17. The method of claim 15, wherein the method further comprises the step of up-sampling the time domain equalizer coefficients to a second desired sampling rate.

18. A system for providing channel equalization comprising:
- a first discrete multitone transceiver for transmitting a time domain signal;
- a second discrete multitone transceiver for receiving the time domain signal; and
- a processor in the second transceiver for processing the known time domain signal, wherein the processor determines an upper triangular matrix of data from the received signal and the transmitted signal, and wherein a plurality of time domain equalizer coefficients and a plurality of target impulse response coefficients are determined in accordance to the upper triangular system to equalize the communication channel.

19. The system in claim 18, wherein the second discrete multitone transceiver comprises an over-sampled discrete multitone receiver.

20. The system in claim 18, wherein the second discrete multitone transceiver is pre-configured with the transmitted signal.

21. The signal in claim 18, wherein the processor further processes the received signal to reduce the effect of noise on the calculation of the plurality of the time domain equalizer coefficients and the plurality of the target impulse response coefficients.

22. The system in claim 18, wherein the processor determines an upper triangular matrix using Givens Rotations.

23. The system in claim 18, wherein the first transceiver is located at a switching office and the second transceiver is located at a remote premise.

24. The system in claim 18, wherein the first transceiver is located at a remote premise and the second transceiver is located a central office.

* * * * *